United States Patent
Zottler

(10) Patent No.: US 9,453,679 B2
(45) Date of Patent: Sep. 27, 2016

(54) INDUSTRIAL FURNACE COVER

(75) Inventor: Peter Zottler, Leoben (AT)

(73) Assignee: Refractory Intellectual Property GmbH & Co. KG, Vienna (AT)

(*) Notice: Subject to any disclaimer, the term of this patent is extended or adjusted under 35 U.S.C. 154(b) by 597 days.

(21) Appl. No.: 13/981,208

(22) PCT Filed: Dec. 30, 2011

(86) PCT No.: PCT/EP2011/074290
§ 371 (c)(1),
(2), (4) Date: Jul. 23, 2013

(87) PCT Pub. No.: WO2012/123041
PCT Pub. Date: Sep. 20, 2012

(65) Prior Publication Data
US 2013/0301669 A1    Nov. 14, 2013

(30) Foreign Application Priority Data
Mar. 14, 2011   (EP) .................... 11002087

(51) Int. Cl.
| F27D 1/18 | (2006.01) |
| C21C 5/52 | (2006.01) |
| F27B 3/16 | (2006.01) |
| F27D 1/00 | (2006.01) |
| F27D 1/02 | (2006.01) |
| F27D 1/14 | (2006.01) |
| B23P 6/00 | (2006.01) |

(52) U.S. Cl.
CPC .............. *F27D 1/1816* (2013.01); *B23P 6/00* (2013.01); *C21C 5/5211* (2013.01); *F27B 3/16* (2013.01); *F27D 1/004* (2013.01); *F27D 1/0006* (2013.01); *F27D 1/022* (2013.01); *F27D 1/024* (2013.01); *F27D 1/148* (2013.01); *F27D 2001/005* (2013.01); *Y02P 10/216* (2015.11); *Y10T 29/4973* (2015.01)

(58) Field of Classification Search
CPC .......... B23P 6/00; C21C 5/5211; F27B 3/16; F27D 1/0006; F27D 1/004; F27D 1/022; F27D 1/024; F27D 1/148; F27D 1/1816; F27D 2001/005
See application file for complete search history.

(56) References Cited

U.S. PATENT DOCUMENTS

| 2,742,023 | A | * | 4/1956 | Reintjes ................ F27D 1/1816 110/331 |
| 3,197,930 | A | * | 8/1965 | Meyer ...................... C21D 9/70 52/378 |
| 3,222,445 | A | * | 12/1965 | Rumberg ................ C01B 31/32 373/73 |
| 3,849,586 | A | | 11/1974 | Jacobs |
| 4,017,960 | A | * | 4/1977 | Kawabe .................... B01J 6/00 228/119 |
| 4,345,332 | A | * | 8/1982 | Wronka .................... F27B 3/12 373/74 |
| 4,633,480 | A | | 12/1986 | Bleimann |
| 2009/0168831 | A1 | * | 7/2009 | Fontaine ................... F27B 3/16 373/73 |
| 2011/0243179 | A1 | * | 10/2011 | Schwer ................... F27B 3/085 373/73 |

FOREIGN PATENT DOCUMENTS

| CN | 2146487 Y | 11/1993 |
| CN | 201242352 Y | 5/2009 |

(Continued)

*Primary Examiner* — Geoffrey S Evans
(74) *Attorney, Agent, or Firm* — Medley, Behrens & Lewis, LLC

(57) ABSTRACT

The invention refers to an industrial furnace cover. Such a furnace can be, i.a., any metallurgical melting and/or treatment vessel, for example an electric arc furnace.

14 Claims, 4 Drawing Sheets

(56) References Cited

FOREIGN PATENT DOCUMENTS

Figure 5:
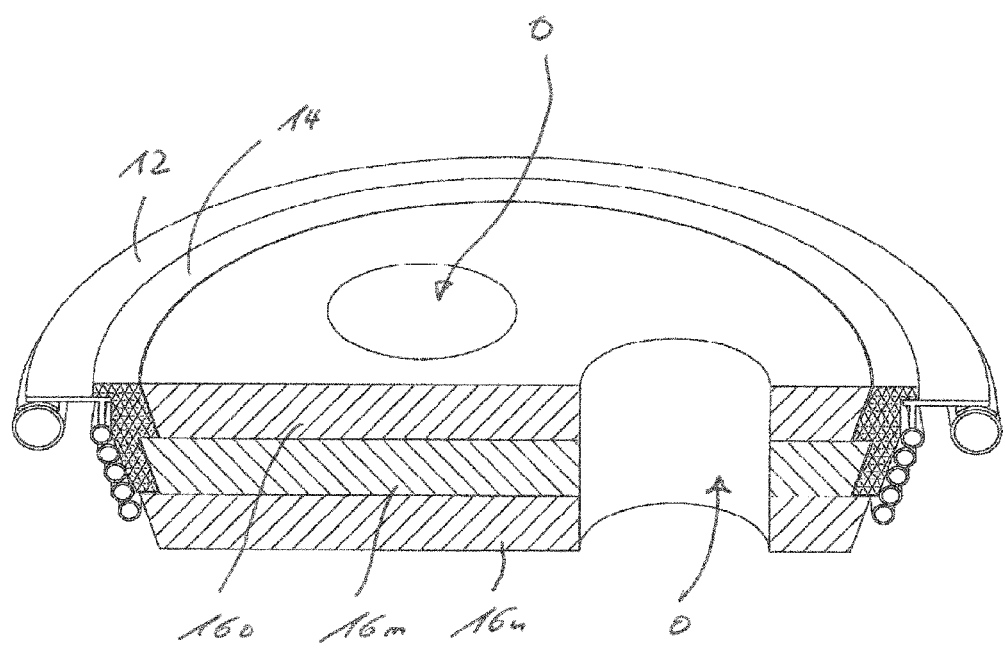

| CN | 101738093 A | 6/2010 |
| EP | 1881285 A1 | 1/2008 |
| JP | S5350213 A | 5/1978 |
| JP | 54-23006 A * | 2/1979 |
| JP | S5440208 A | 3/1979 |
| JP | 59-89980 A * | 5/1984 |
| SU | 549669 A1 | 3/1977 |
| SU | 284793 A1 | 1/1978 |

* cited by examiner

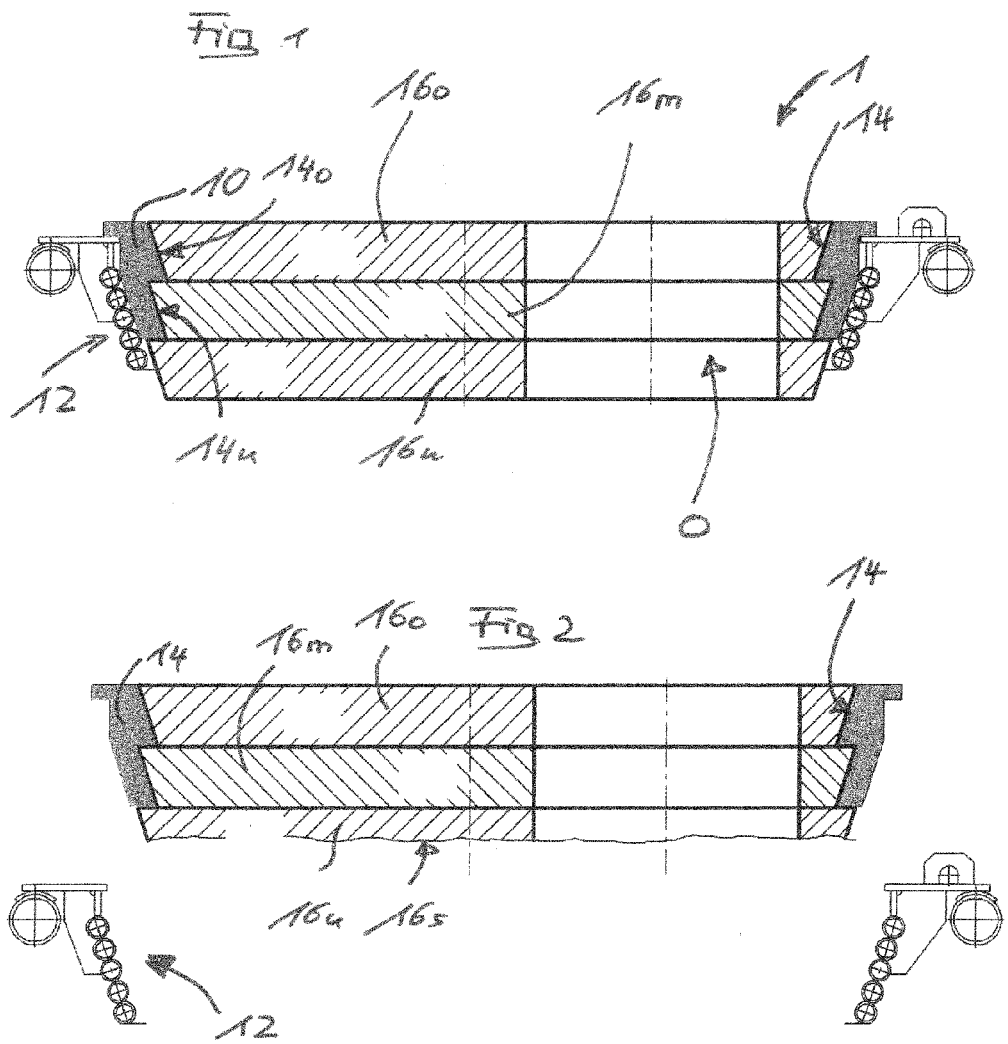

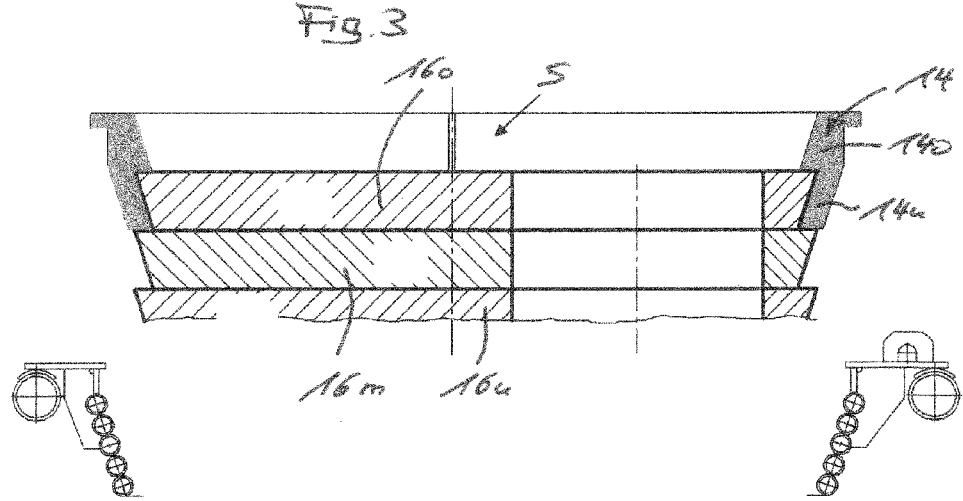
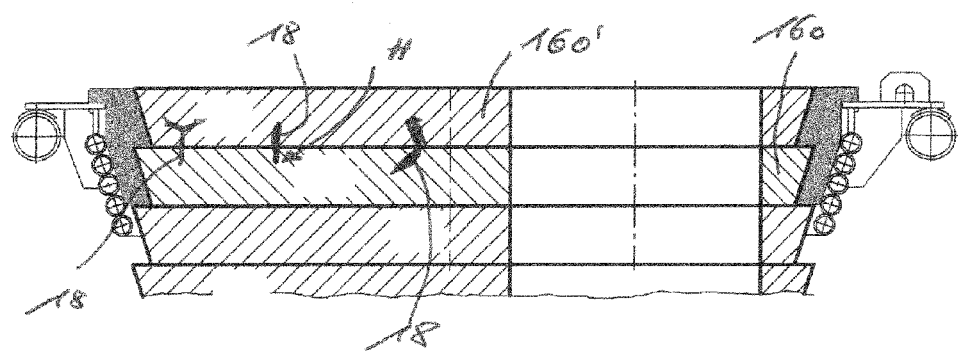

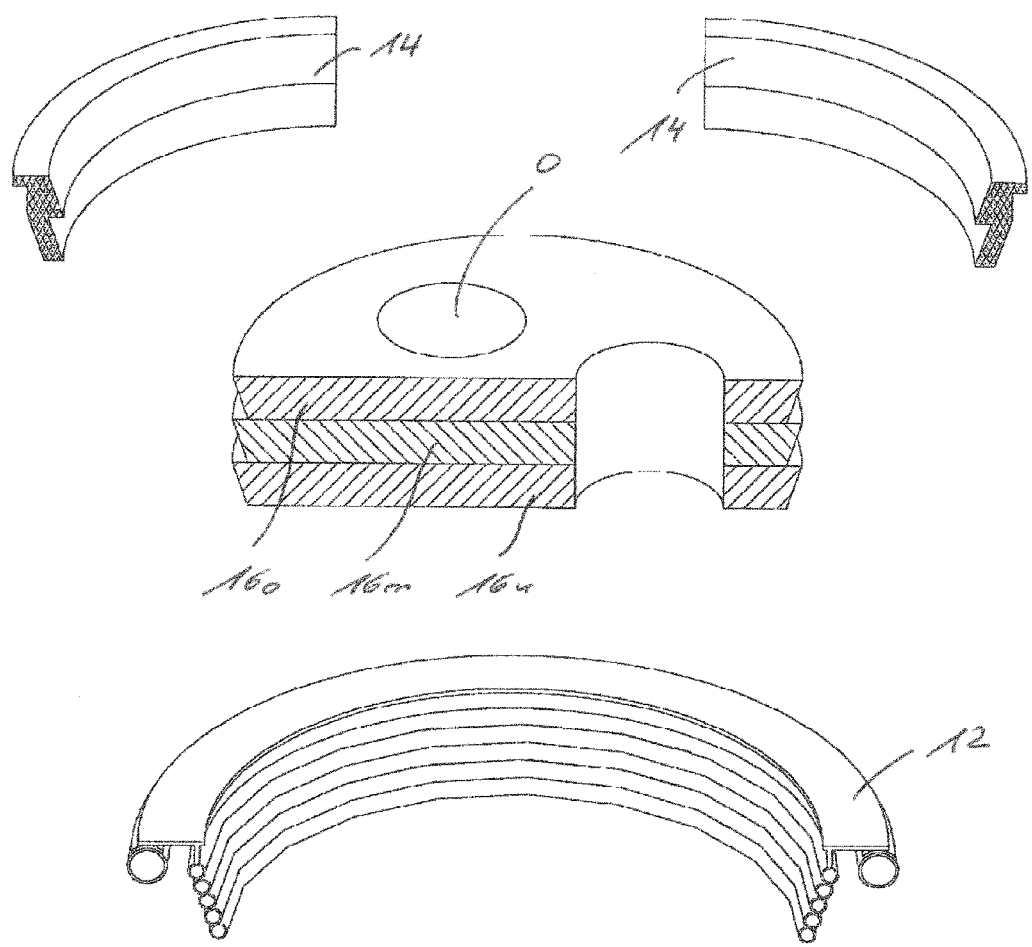

INDUSTRIAL FURNACE COVER

The invention refers to an industrial furnace cover. Such a furnace can be, i.a., any metallurgical melting and/or treatment vessel, for example an electric arc furnace.

Hereinafter reference is made to a cover for an electric arc furnace (EAF) but without limiting the scope of the invention insofar. All directions given (upwardly, left, on top, uppermost etc.) relate to a mounted position of said cover, when the furnace is working.

An EAF typically comprises a so-called hearth with sidewalls extending upwardly, an upper vessel and a cover (roof) which is mounted detachably onto said upper vessel. Electrodes protrude through corresponding openings in the cover into the bath of molten metal within the furnace (hearth).

While the hearth and sidewalls are typically lined with appropriate refractory materials, either a monolithic lining and/or a brick lining, the said upper vessel often comprises water-cooled panels.

The harmful environment, caused by high temperatures, slag attack and the like requires high quality materials for the furnace roof (cover)

Therefore the roof (cover) again is often made of refractory material, either comprising refractory bricks (U.S. Pat. No. 3,849,586) or provided by a monolithic refractory mass, cast in an appropriate frame. Water cooled covers are known from U.S. Pat. No. 4,633,480. While refractory materials erode by and by the water cooled panels require a complex technology.

It is an object of the invention to provide an industrial furnace cover withstanding the harmful environment. In particular it is an object of the invention to prolongate the life-time (availability) of corresponding parts.

The invention starts from a furnace cover made of refractory material fit in a corresponding frame (conduit, ring or the like), typically made of metal.

In particular the lowermost part of such refractory lining is exposed to dust, high temperatures, temperature changes and hot melt and/or slag attack. This leads to a corresponding erosion of the refractory material. Considering mechanical, thermal and safety aspects the refractory lining must be repaired and/or renewed after a certain degree of erosion, corrosion and/or destruction.

Starting with a new refractory lining of a thickness X the cover is typically refurbished when the thickness has decreased to about ⅔ or ½. The cover is removed, the frame is broken, i.e. the remaining refractory lining is disposed and a new lining installed within the frame.

One aspect of the invention is to keep the remaining (not yet worn) refractory material and to use it again during further installations of the furnace cover.

To achieve this the frame mentioned is arranged detachably so that it may be separated from the refractory ceramic "core".

This separation step allows to re-arrange the frame in a different position as before, namely displaced in an upward direction and essentially perpendicular to the main surfaces of said cover (or, in other words: essentially parallel to the longitudinal extension of the electrodes, when the cover is in its mounted position) and the furnace working.

The frame can be remounted by this displacement in such a way that the remaining refractory material then protrudes the frame downwardly, i.e. toward the metal melt in the working position of the furnace with closed roof/cover.

At the other end of the frame (i.e. its upper portion) this displacement provides space allowing to install (build up) a new layer of refractory material within the frame. This new layer may be cast (a monolithic refractory mass is cast, poured or just filled in) or provided by preshaped workpieces.

This arrangement allows the following advantages:
The refractory material (layer(s)) of such furnace cover, which during previous use was arranged on top of any material (layer) worn during said previous use may now be used again.
The whole refractory block is just lowered within the frame so as to displace the not yet worn refractory material toward the metal melt. This part of the refractory material may then be used again but now being directly exposed to the furnace interior and insofar directly exposed to temperature, slag attack etc. within the furnace.
The reduced thickness of the thus remaining refractory material (layer(s)) is compensated by adding new refractory material on top of it. Thus the refractory part of the cover may get its original thickness back, with no disposal of any refractory material being necessary. It is sufficient to add refractory material in an amount which at best corresponds to the amount of the refractory material worn during previous use to regain the basic thickness of the refractory filling.
This refurbishing may be repeated.

The basic idea of the invention may be summarized as follows: Any refractory material worn at the underside of the refractory block of said furnace cover is replaced by adding a corresponding layer (layer of similar thickness) on top of the remaining "mid layer" and parallel displacement of the refractory block within its frame such that the refurbished cover and its refractory lining have the same position with respect to the furnace and the melt within the furnace as before.

In its most general embodiment the invention relates to an industrial furnace cover, comprising the following features;
at least two layers of refractory material,
said layers are arranged one on top of the other when said cover is in its mounted state,
a frame,
said frame extends at least partially around and houses at least one of said layers,
said frame being detachably mounted to said at least one layer.

The phrase "at least two layers" does not necessarily means two independent layers but characterizes the corresponding refractory block by providing at least one part (layer) which may be eroded during use of the cover and at least one further part (layer) remaining. The layer/part which may be eroded is the respective lowermost part of the refractory block.

A completely new cover may comprise a "one piece" refractory block (filling in said frame), meaning that the refractory lining is made of one cast refractory block or one preshaped workpiece, part of which will be eroded during subsequent use. As an alternative, preferred in view of manufacturing and use, the said refractory cover lining for a new cover may be made by arranging two or more layers one on top of the other. These layers may be layers made of a monolithic material and/or shaped workpieces.

To avoid loosening of individual layers and/or parts thereof the invention provides various technologies to join these layers, i.a, by an adhesive, a mortar, an anchor, a bracket or the like. It is important to achieve the necessary integrity of the whole refractory block (lining), i.e. an integral structure between the various parts and layers of the refractory block. Further examples are disclosed by the attached drawing and corresponding description.

The invention provides the following embodiments which may be realized individually or in optional combinations.

The frame, which may have the shape of a ring, may extend around at least an uppermost layer of refractory material. In other words: it is possible to place the frame such that the refractory material protrudes the frame downwardly. This design has the advantage that the protruding part of the refractory serves as a barrier for the frame. The frame can be made of metal (steel, copper) or refractory material or combinations thereof, for example of a multi-part metal ring with an inner refractory lining.

For the reason mentioned above the frame may extend around all layers except the lowermost one.

At least an inner wall of the frame may be profiled to achieve a form-fit or other integral design with the corresponding refractory material forming the cover. This includes an inner wall of the frame being inclined with respect to a vertical plane. This leads to a conical like cross section of the frame with a smaller lower and a wider upper end, thus serving as a bearing surface for the respective refractory layers and avoiding any refractory material falling downwardly unintentionally. In one embodiment the frame (its inner wall) is funnel shaped.

The detachable design may be realized by a multi-part frame. In case of an essentially circular furnace cover, including an essentially circular frame, the frame may be made of 2 semi circles or 3 pieces each extending over 120 degrees etc. These pitch circles may be linked together by any suitable techniques known in the art, for example so called quick-release fasteners, flanges and bolts, screws etc.

The refractory part of the furnace roof/cover may be made exclusively of refractory monolithics, such as a refractory mass based on alumina, magnesia, silica or combinations thereof. Alumina contents of >55% by wt. or >70% by wt, are suitable. A suitable batch may comprise (all in wt.-%): 91 MgO, 1.1 CaO, 0.2 $SiO_2$, 0.2 $Fe_2O_3$, 5 $Al_2O_3$, 1.7 $P_2O_5$, remainder: impurities, and a grain fraction <5 mm or 94 $Al_2O_3$, 3.5 $Cr_2O_3$, remainder: minor components, all in a grain fraction <6.3 mm.

It may be made as well only of shaped workpieces of any suitable refractory batch. These workpieces may be shaped as pie slices or in any other geometry. Joints between workpieces of adjacent layers may be arranged offset to increase the integrity of the whole device.

Layers of monolithic materials may alternate with layers of workpieces or both may be combined.

Typically the total thickness of the refractory lining of an EAF cover is between 50 and 900 mm. Accordingly it is proposed to give at least one (or each) layer a thickness (perpendicular to its main surfaces) of between 50 and 700 mm with a preferred maximum thickness for common industrial applications of 600 mm, 500 mm, 300 mm or 250 mm and a minimal thickness of 70 mm, 100 mm or 150 mm.

The cover may further comprise an envelope/collar/casing comprising cooling means being arranged around the said cover frame. These cooling means may be cooling panels arranged side by side along the periphery of said cover. The cooling means may be designed as part of the detachable frame.

The invention further provides a method of refurbishing an industrial furnace cover as described, which method comprises the following subsequent steps:
removing said frame with the remaining refractory material from the corresponding furnace,
detaching the frame,
arranging and closing the frame in a position further remote from the lowermost layer than before,
arranging a new layer on top of the uppermost layer within said frame to provide a new uppermost layer.

According to one embodiment the new uppermost layer may either be cast onto the previously uppermost layer or provided by arranging at least one preshaped workpiece onto said previously uppermost layer and providing a joint/connection between the previously uppermost layer and the new uppermost layer.

Further features are disclosed in the subclaims and the other applications documents, including the following drawing and corresponding description.

In the drawing the following is shown,

FIG. 1:
a schematic cross-sectional view of a furnace cover in its original (new) design, before use FIG. 2:
a schematic cross-sectional view of the furnace cover according to FIG. 1 after a certain time of use FIG. 3:
a schematic cross-sectional view of the furnace cover according to FIG. 2 after displacement of the corresponding frame FIG. 4:
a schematic cross-sectional view of the furnace cover according to FIG. 3 after refilling of the frame FIG. 5:
a schematic 3D view of a furnace cover according to FIG. 1

FIG. 6:
a schematic 3D view according to FIG. 5 with detached frame parts

FIGS. 1 and 5 disclose a furnace cover 1 comprising a circular metallic frame 10, placed within a corresponding outer cooling collar 12. The inner wall 14 of frame 10 provides a saw tooth tread design with two inclined sections 14*o*, 14*u*.

The space within upper section 14*o* is filled by an upper monolithic layer 16*o* of alumina rich refractory material, the lower section 14*u* is filled by the same material, providing an intermediate refractory layer 16*m* while a further lower refractory layer 16*u* is attached to said intermediate layer 16*m* and protruding frame 14 downwardly.

All three refractory layers 16*o*, 16*m*, 16*u* together form a monolithic block assembled within frame 14. One of three openings (through which non illustrated electrodes protrude) is marked as O.

The refractory block as well as each of its layer provides main surfaces running horizontal in the figures.

This cover 1 is placed on top of an electric arc furnace in a manner known in the art and therefore not further shown and described here.

After a certain time of use the lower refractory layer 16*u* is at least partially worn, namely along its (lower, main) surface 16*s* vis a vis a corresponding metal melt, treated in the furnace. Said melt is symbolized in FIG. 2 by reference M.

After a certain degree of erosion the cover is refurbished as follows:

Frame 14 with the remaining, not yet worn part of the refractory block is taken off collar 12 and opened (see as well FIG. 6). This is achieved by—not illustrated quick-release fasteners, attached to corresponding circumferential ends of the respective frame parts, for example 3 parts of each 120 degrees divided circle.

Thereafter the frame is mounted again but in a displaced position, namely such that layer 16m, previously arranged within frame section 14u, now protrudes said frame portion 14u downwardly while layer 16o, previously arranged within frame section 14o now being arranged within frame section 14u. Accordingly there is no refractory material any more within frame section 14o at this time (FIG. 3) but a free space S.

According to the inventive concept new refractory material is then filled into space S defined by frame portion 14o. In the embodiment shown in FIG. 4 this is achieved by a corresponding casting process. Thus a new refractory layer 16o' is provided.

As shown in FIG. 4 the integral design of the whole refractory block, including an integral design between layers 16o' and 16o may be optimized by integrating anchors 18. Three possible designs of said anchors 18 are illustrated in FIG. 4. To fix said anchors 18 holes H may be drilled into the already solidified layer 16o. Anchors 18 are then mortared into said holes H. During casting of the refractory material to provide new upper layer 16o' the said anchors 18 are soused by said monolithic mass and integrated in said refractory material after hardening. At the same time, anchors protruding layer 16o' upwardly may be integrated in layer 16o. Ceramic anchor means may be used as well.

After rearrangement of the frame 14 within collar 12 (FIG. 4) cover 1 may be used again.

The refurbishing concept described allows all layers (16u, 16m, 16o, 16o') being used until they have been placed in the lowermost position and eroded. Any disposal of any refractory material is avoided.

The invention claimed is:

1. An industrial furnace cover, comprising the following features:
   at least two layers (16o, 16m, 16u) of refractory material,
   said layers (16o, 16m, 16u) are arranged one on top of the other when said cover (1) is in its mounted state,
   a frame (14),
   said frame (14) extends at least partially around and houses at least one of said layers (16o, 16m),
   said frame (14) being detachably mounted to said at least one layer (16o, 16m).

2. The industrial furnace cover according to claim 1 with the frame (14) extending around at least an uppermost layer (18o) of refractory material.

3. The industrial furnace cover according to claim 1 with the frame (14) extending around all layers (16o, 16m) except the lowermost one (16u).

4. The industrial furnace cover according to claim 1 with the frame (14), at least one inner wall (14o, 14u) of which being inclined with respect to a vertical plane when the cover (1) is in its mounted state.

5. The industrial furnace cover according to claim 1 with the frame (14), the inner wall of which being funnel shaped.

6. The industrial furnace cover according to claim 1, wherein the frame is a multi-part frame.

7. The industrial furnace cover according to claim 1 with at least one layer in the at least two layers (16o, 16m, 16u) made of a cast refractory material.

8. The industrial furnace cover of claim 1 with at least one layer in the at least two layers made of a preshaped refractory material.

9. The industrial furnace cover according to claim 1 with at least one layer in the at least two layers made of at least one preshaped refractory workpiece.

10. The industrial furnace cover according to claim 1 with at least two adjacent layers (16o', 16o) in the at least two layers or two adjacent workpieces being joined by at least one of the following means:
    adhesive,
    mortar,
    anchor (18), or
    bracket.

11. The industrial furnace cover according to claim 1 with at least one layer in the at least two layers (16o, 16m, 16u) having a thickness, in a vertical direction when said furnace cover (1) is in its mounted state, of between 50 and 700 mm.

12. The industrial furnace cover according to claim 1 with at least one layer in the at least two layers (16o, 16m, 16u) having a thickness, in a vertical direction when said furnace cover (1) is in its mounted state, of between 100 and 300 mm.

13. A method of refinishing an industrial furnace cover, the industrial furnace cover comprises:
    at least two layers (16o, 16m, 16u) of refractory material,
    said layers (16o, 16m, 16u) are arranged one on top of the other when said cover (1) is in its mounted state,
    a frame (14),
    said frame (14) extends at least partially around and houses at least one of said layers (16o, 16m),
    said frame (14) being detachably mounted to said at least one layer (16o, 16m), the method comprising:
    removing said frame with the remaining refractory material from a corresponding furnace,
    detaching the frame,
    arranging and closing the frame in a position further remote from a lowermost layer in the at least two layers than before, and
    arranging a new layer on top of an uppermost layer in the at least two layers within said frame to provide a new uppermost layer.

14. The method according to claim 13, wherein the new uppermost layer is either cast onto the previously uppermost layer or provided by arranging at least one preshaped workpiece onto said previously uppermost layer and providing a joint between the previously uppermost layer and the new uppermost layer.

* * * * *